Oct. 22, 1968  T. E. NEEDHAM ETAL  3,406,802
OBJECT DETECTION DEVICES
Filed Oct. 25, 1966  4 Sheets-Sheet 3
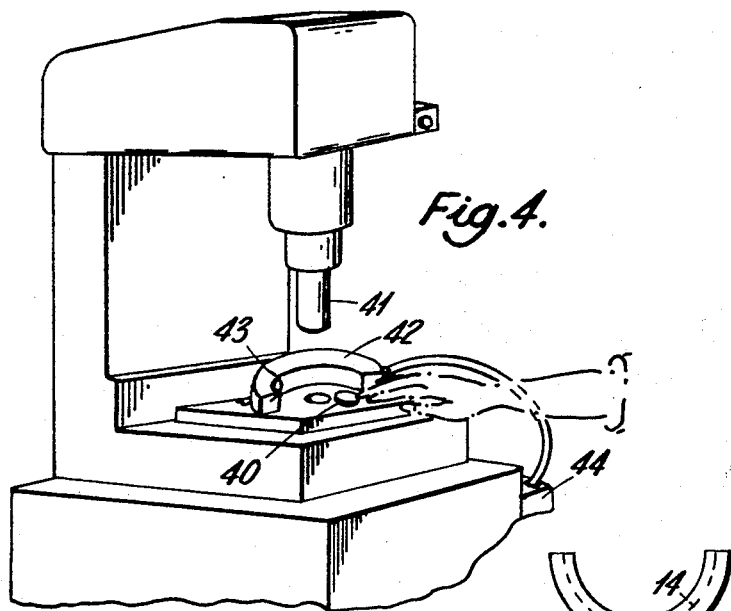
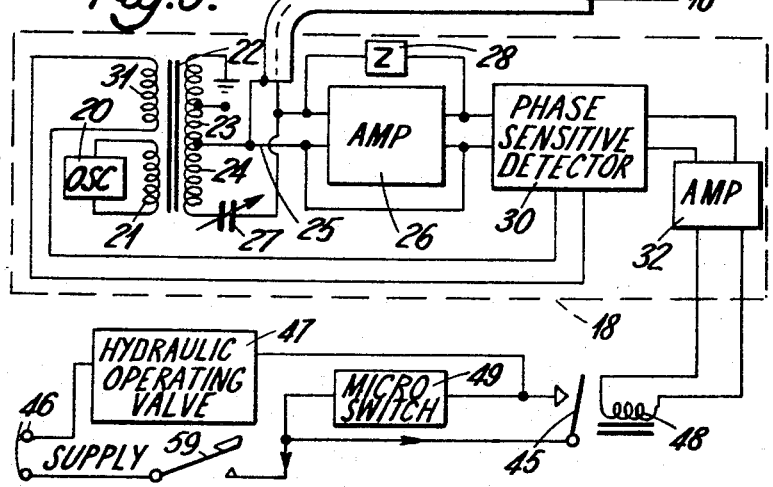
Inventors
Thomas Edgar Needham
Kenneth Hubert Clayton
By
Watson, Cole, Grindle + Watson
Attorneys

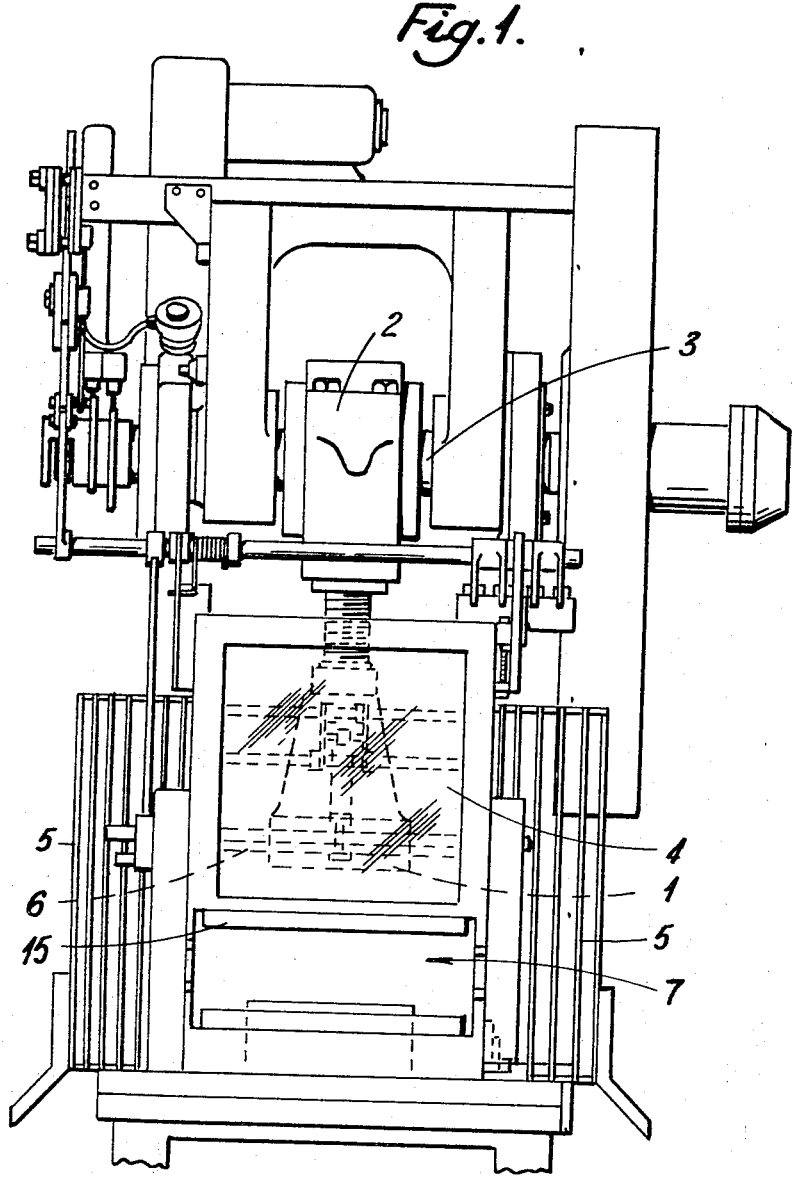

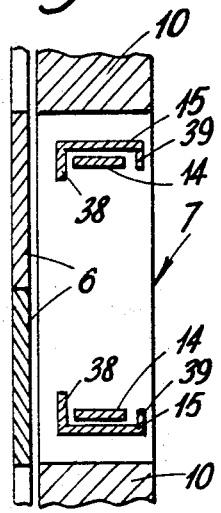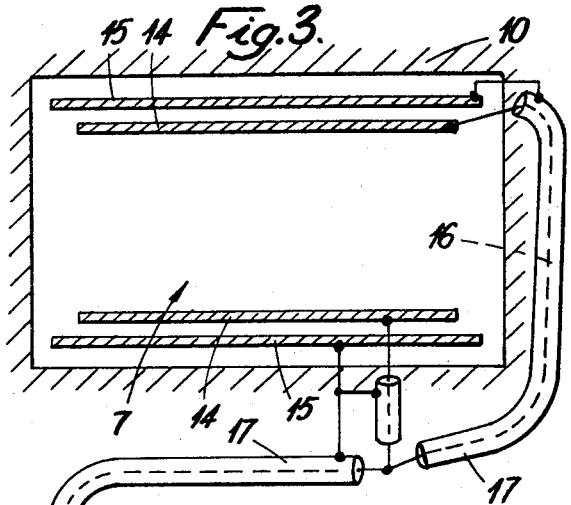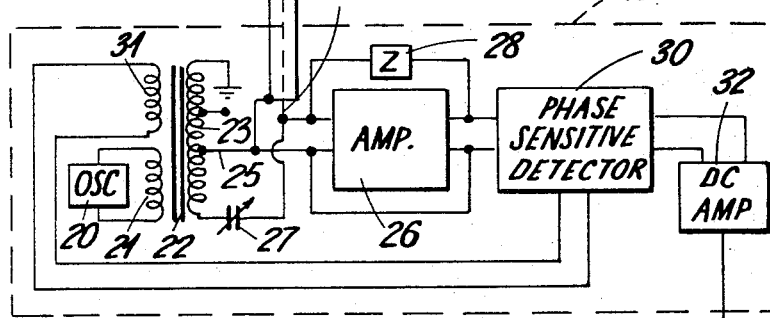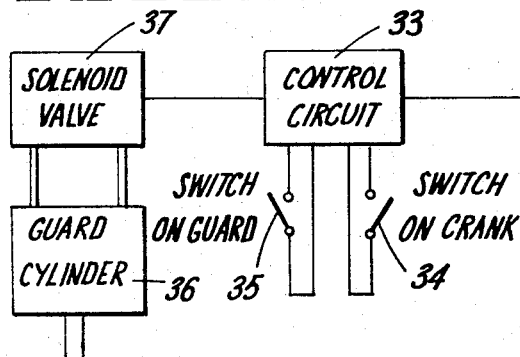

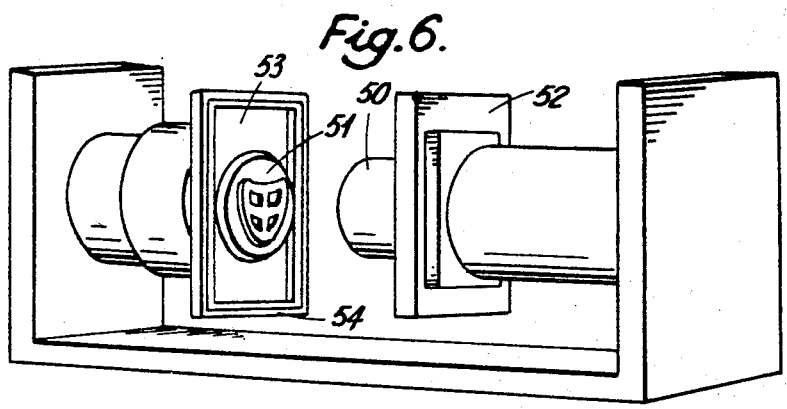
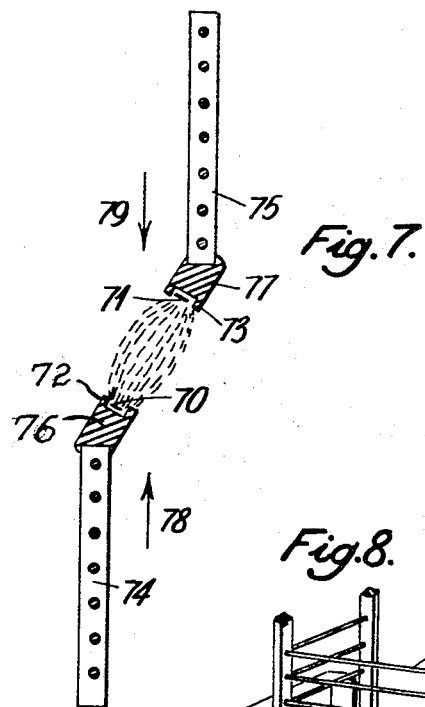
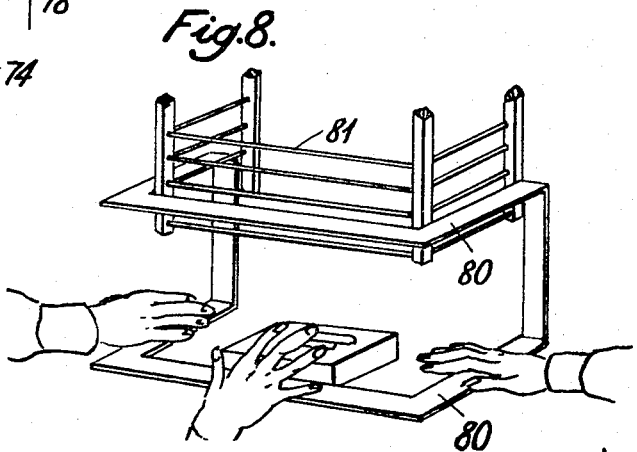

United States Patent Office 3,406,802
Patented Oct. 22, 1968

3,406,802
OBJECT DETECTION DEVICES
Thomas Edgar Needham and Kenneth Hubert Clayson, Solihull, England, assignors to Wilmot-Breeden Limited, Birmingham, England, a British company
Filed Oct. 25, 1966, Ser. No. 589,394
Claims priority, application Great Britain, Apr. 1, 1966, 14,596/66
12 Claims. (Cl. 192—130)

ABSTRACT OF THE DISCLOSURE

A capacitance type object detection system, particularly suitable for guarding or controlling a machine tool, has a strip-form electrode extending around part of the periphery of a region to be guarded. One of the faces of the strip faces across the opening and a conductive screen is provided extending around the other face of the electrode to surround the whole electrode behind the plane of said one face. A three-terminal impedance measuring circuit is connected to the electrode, the screen, and ground to give an output responsive to the changes in the capacity between the electrode and ground without being affected by the normally much greater capacitances between the electrode and screen and between the screen and ground.

---

This invention relates to object detection devices for detecting an earthed object by the change in capacitance to earth of a capacitive electrode when the body is in the neighbourhood of the electrode. As will be apparent from the following description, the invention finds particular application in the guarding of machine tools and the like to ensure the safety of the operator.

In general with capacitance type object detection systems heretofore, a problem arises that the capacitance between the hand or arm or any other earthed object and the electrode is in shunt with the leakage capacitance between the electrode and earthed bodies. This is a particularly serious problem in a machine tool which is normally made of metal and in which the capacitance electrode loop should extend around the whole opening through which access can be obtained to the moving parts. In such circumstances, there would normally be a very substantial capacitance between the electrode and the earthed metal structure of the machine. If the aperture is large, the presence of a hand within the aperture may give only a very small change in the capacitance between the electrode and earth. Such small changes in capacity can be detected and measured by means of capacitance measuring bridges but this requires a bridge of long term stability if frequent re-adjustment is to be avoided. Problems also arise due to the temperature coefficient of capacitance to earth of the lead connecting the electrode to the measuring equipment. If a screened cable is used to minimize variations of capacitance between the connecting lead and earth, then this screening in the cable introduces a very large capacitance between the connecting lead and earth. In a typical capacitance detection system for controlling a guard for a machine tool, it has been found that the electrode had a capacitance to earth of 20 picofarads whilst the connecting screened cable had a capacitance of 200 picofarads. The change in capacitance introducing a hand into the centre of a rectangular loop of 20" x 10" was only 1 picofarad. It will be seen therefore, with such systems, it has been necessary heretofore to have electrical equipment which is accurately responsive to very small changes in a large capacitance and it is necessary also to ensure the stability of this large capacitance and of the equipment detecting the change in capacitance.

In the specification of co-pending application No. 586,436, filed Oct. 13, 1966 and entitled "Object Detection Device," there is described a capacitance type object detection system for detecting the presence of an earthed object within an opening forming an entry to a region to be guarded comprises an elongated electrode extending around the periphery of said opening, the electrode being in the form of a strip with one of its faces facing across said opening, a conductive screen for said electrode extending around the other face of the electrode to surround the whole electrode behind the plane of said one face, and a three-terminal impedance measuring circuit arranged to give an output signal responsive to changes in the capacity between said electrode and earth without being affected by any capacitance between the electrode and the screen. Three terminal measuring circuits, particularly transformer ratio-arm bridges are well known and have the property that an output signal can be obtained dependent on the impedance between two terminals whilst being unaffected by any impedance between either of these two terminals and the third terminal. The third terminal is connected to the screen and of the other two terminals, one is earthed and the other connected to said electrode.

It is an object of the present invention to provide an improved form of capacitance type object detection system for use with machine tools.

We have found, however, that it is not essential for the electrode completely to surround the opening. It is possible for example to have two electrodes facing one another or to have an electrode curved in the form of an arc, e.g., a semi-circle so as partially to surround a region to be guarded.

More generally, an electrode used to guard a region need not be in a flat plane; its plane may be shaped to conform to the shape of the region to be guarded.

The aforementioned electrode may be in the form of a metal strip extending partly around the region in which the presence of an earthed body is to be detected. The screen is preferably then also a strip of slightly greater width than the electrode and extending around the electrode on the outer side thereof and preferably also having flanges extending inwardly of the aperture to shield the edges of the electrode strip.

Preferably the or each electrode is covered with insulating material. In a machine tool, the or each electrode may be so positioned or arranged that it cannot be touched by an operator's hand or other earthed body.

Although the screen around each electrode cannot eliminate all the capacitance between the electrode and earth, it can readily be arranged to eliminate most of this capacitance. The use of the three-terminal measuring circuit eliminates the effect of the capacitance of the cable and, since the balancing circuit may very simply be readjusted if necessary, the long term stability problems are eliminated.

The invention is particularly applicable to the control of a safety guard for a power operated tool. For such a tool, there has to be a relatively large aperture providing access to the moving parts. With the arrangement of the present invention, the presence of an operator's hand anywhere within the aperture can readily be detected and the device can be used to provide a signal whenever the operator's hand is in this aperture. The change in this signal when the hand is withdrawn can be used automatically to effect the closing of a mechanical guard and thereby operation of the tool or other machinery so that an operator merely has to put the work piece in position and withdraw his hands thereby initiating the operation of the machine while still providing a full safeguard against any operation of the machine when the operator's hand or arm is within the aperture.

In one arrangement for use on a machine tool, a mechanical guard is provided comprising two gates movable towards one another to close an opening and two electrodes are arranged on the gates facing across the opening when the gates are apart, the electrodes being connected in parallel to the three-terminal impedance measuring circuit. The gates may be arranged to overlap when closed and, in this case, the electrodes are preferably arranged to face one another when the gates are open so as to define a plane in which any earthed body is detected. The electrodes, with their screens, may be mounted in or embedded in insulating material. This material may be for example, rubber or a resilient plastic. In this construction, as in the other machine tool guards to be described, the electrode system and measuring circuit may be used to give a guard signal to prevent operation of the machine if any earthed body is in the opening. The arrangement of the present invention is particularly applicable to systems in which the withdrawal of an earthed body, usually the operator's hand, automatically initiates operation of the machine. The signal may be used for example to initiate closing of a mechanical guard which has to be closed before a tool or the like can be actuated within the enclosed region. If desired, separate electrode systems may be provided for performing both guarding and triggering functions.

As another example of the application of the invention, in a molding machine or the like in which two die plates are brought together, to guard against the presence of an earthed body between the die plates, electrodes may be arranged around or partly around each of the die plates, the electrode or electrodes around one die plate facing the electrode or electrodes around the other. Each of the two electrode systems employed might be a closed loop, typically of square or rectangular form mounted on the die plate or the platen carrying the die plate. It is not necessary however to have a closed loop and each electrode system might comprise two or more straight or curved electrodes arranged around the periphery of the die plate or platen.

The following is a description of a number of embodiments of the invention, reference being made to the accompanying drawings in which:

FIGURE 1 is a front view of a press embodying guard means operated by an earthed body capacitance type detection system;

FIGURE 2 is a transverse section through the electrode system in FIGURE 1;

FIGURE 3 is a diagram illustrating the detection system used in the press of FIGURE 1;

FIGURE 4 is a perspective view of a riveting press;

FIGURE 5 is a diagram illustrating the detection system used in the arrangement of FIGURE 4;

FIGURE 6 is a diagrammatic perspective view illustrating guard electrodes on a molding machine;

FIGURE 7 is a sectional view through a pair of guard gates for a machine tool; and FIGURE 8 is a perspective view illustrating another electrode arrangement for guarding part of a machine.

Referring to FIGURE 1, there is shown a press having a ram 1 driven by eccentrics 2 on a crankshaft 3. Guarding of the press is effected by a glazed front guard 4 on vertical hinges, fixed wire mesh side guards 5 and a pair of vertically slidable gates 6 for closing an opening 7 in the front guard 4. Only one of the gates 6 is shown in FIGURE 1. Reference may be made to the specification of co-pending application No. 508,458, filed Nov. 18, 1965 (A. R. Guy and M. E. Lloyd) for a fuller description of such a construction of guards for a press.

The main body structure of the press is of metal and is electrically earthed. This earthed structure is indicated diagrammatically at 10 in FIGURES 2 and 3. When the gates 6 are open, the operator can obtain access to the moving parts through the opening 7. This opening, at its outer end, has top and bottom electrodes 14 in the form of metal strips extending across the top and bottom of the opening. Closely adjacent these strips above the upper strip and below the lower strip are metallic screens 15 which are slightly wider than the electrode strips 14 and which have flanges extending around the edges of the electrode strips. These screens 15 serve to reduce the capacitance between the electrodes and the earthed body of the machine although introducing a substantial capacitance between each of the electrodes 14 and the associated screen 15.

The present invention is concerned more particularly with the detection of an earthed object within the region between the electrodes 14. The electrodes 14 are connected by the inner conductors 16 of co-axial cables 17 to a capacitance sensing device indicated generally at 18 in FIGURE 3. The screens 15 are connected to the outer conductors of these co-axial cables.

The device 18 includes as oscillator 20 providing an alternating current which is applied to a primary winding 21 of a transformer 22 having closely coupled secondary windings 23, 24. These windings provide two output voltages in known ratio; typically the winding 23 will have ten times as many turns as the winding 24. The two windings are connected in series and the junction of these two windings is connected to a lead 25 referred to hereinafter as a neutral line. The other end of the winding 23 is earthed. The screen of the co-axial cable 17 is connected to the neutral line 25. This neutral line is also connected to one input terminal of an amplifier 26. The other input terminal is connected to the inner conductor 16 of the co-axial cable 17. The winding 24 applies a voltage to one terminal of adjustable capacitor 27, the other terminal of which is connected to the input terminal of the amplifier. The amplifier has a feedback circuit which includes as impedance 28. The capacitor 27 is adjusted, when no earthed body is between the electrodes 14, so as to provide an input current substantially balancing any residual input from the electrodes 14 due to stray capacitance between the electrodes and earth. By making winding 23 with more turns than winding 24, the capacitor 27 has to have a larger capacitance than the capacitance being balanced out and it is thus readily possible to construct a suitable adjustable capacitor 27. This capacitor is adjusted so that, in the absence of any earth body between the electrodes 14 there is negligible output voltage from the amplifier 26. When a hand is put near the electrode system however, because the hand is earthed, there is an appreciable current introduced into the amplifier and this changes the output voltage. This output voltage is applied to a phase sensitive detector 30 which has a reference alternating current signal derived from a further winding 31 on the transformer 22. The phase sensitive detector gives a direct voltage output which is applied to a D.C. amplifier 32 and this may typically be used to operate a relay or an electronic trigger circuit in a control circuit 33. The control circuit is arranged so that, whenever an earthed body such as the operator's hand or arm is removed from the aperture between the electrodes, when gates 11, 12 are open, closing of the gates is triggered and operation of the machine is initated, as is described in the aforementioned application No. 508,458. Reference may be made to that specification for a fuller description of a suitable control circuit which is responsive to a switch 34 on the crankshaft 3 for ensuring the gates cannot be opened until the ram 1 is in its uppermost position, and a switch 35 on the gates 6 to ensure that the machine cannot be operated until the gates are fully closed. The operation of the gates 6 is effected by a pneumatic cylinder 36 to which air is admitted by a solenoid-operated valve 37 controlled by the control circuit 33.

Referring to FIGURE 2 it will be noted that the screens 15 have two flanges 38, 39. The rear flange 38 extends further into the aperture 7 than the outer flange 39 thereby more closely defining the inner boundary of the guarded region where screening from the metallic structure of the machine is the more important.

FIGURE 4 illustrates a riveting press which cannot be completely enclosed with mechanical guards because open access is required during operation for a workpiece 40, which is to be riveted, to extend into the region under the riveting tool 41. In this embodiment of the invention, a semi-circular electrode system 42 is provided with a screen shaped to give a detection region lying within the arc of the electrode and of small dimension in the vertical plane so that it can detect earthed objects in the region immediately above the workpiece 40. In this type of machine, no mechanical guard can be used and the earthed body detection system is used therefore directly to inhibit the operation of the machine. FIGURE 5 is an electrical diagram illustrating the arrangement employed for inhibiting operation of the press of FIGURE 4 when the operator's hand or any earthed object is put in the region to be guarded. The workpiece is located immediately below the guarded region so that it will not itself inhibit operation of the machine. The electrical circuit of FIGURE 5 is housed at 44 in FIGURE 4 and is, in many respects, similar to that of FIGURE 3. The same reference charatcers are used in FIGURES 3 and 5 to indicate corresponding elements. In FIGURE 5, the output of the amplifier 32 is fed to the operating coil 48 of a relay having a normally open contact 45 in the circuit from a supply source 46 to the hydraulic operating valve 47 for the press. The output of the amplifier 32, in the absence of any earthed body in the guarded region, energizes the coil 48 so closing contact 45. A foot switch 59 is used to complete the circuit when the press is to be operated. If any earthed body is in the guarded region, the relay coil 48 is de-energised so opening contact 45 and preventing operation of the press. A micro-switch 49 is operated by the plunger of the press just before the tool enters the guarded region and completes a circuit in parallel with the contact 45 to prevent that machine being stopped because the presence of the tool is sensed by the electrode system.

FIGURE 6 illustrates the application of the invention to a molding machine or press having co-operating die plates 50, 51 carried on platens 52, 53. In this case there are two closed loop electrode systems, of which one is seen at 54. These electrode systems, each having its associated screen, extend around the peripheries of the two platens 52, 53 facing one another. These electrode systems thus serve to detect the presence of any earth body between the two electrodes. In a molding machine or press such as is shown in FIGURE 6, the finally formed articles might be ejected using an air blast and it will be noted that, even if these are metal articles, they will not be electrically earthed whilst being ejected and hence would not give an unwanted or false indication inhibiting operation of the machine.

As shown in FIGURE 7, it may sometimes be convenient to mount electrodes 70, 71 with their respective screens 72, 73 on movable guards 74, 75. In the particular construction shown in FIGURE 7, the electrodes and screens are similar to those of FIGURES 1 to 3 but are mounted on resilient supports 76, 77. The two guards constitute gates which slide in the directions of the arrows 78, 79 and overlap when closed. The electrodes are arranged to face one another when the gates are open, i.e. when maximum sensitivity is required.

FIGURE 8 shows a single closed loop electrode 80 which is shown diagrammatically. This electrode is provided with a screen similar to the screen 15 of FIGURES 1 to 3. Typically the electrode is mounted on a machine tool having a mechanical guard 81. The electrode system, although in the form of a single closed loop, has the plane of the loop in a vertical plane at the rear with top and bottom forwardly extending portions so defining a working region to which access is available from the front and two sides. In the drawing, this is indicated by the various positions of the operator's hand. The screens around the electrodes ensure that the sensitive region in which earthed bodies are detected extends vertically from the top portion of the electrode to the bottom and, in effect gives three protective "walls" forming the front and two sides of the aforementioned working region.

We claim:

1. A capacitance type object detection system for detecting the presence of an earthed object within an opening forming an entry to a region to be guarded, which system comprises an elongated electrode extending around part of the periphery of said opening, the electrode being in the form of a strip having two faces with one of its faces facing across said opening, a conductive screen for said electrode extending around the other face of the electrode to surround the whole electrode behind the plane of said one face, and a three-terminal impedance measuring circuit arranged to give an output signal responsive to changes in the capacity without being affected by any capacitance between the electrode and the screen.

2. A capacitance type object detection system as claimed in claim 1 and arranged for use with a machine tool having a mechanical guard wherein means are provided responsive to said output signal operative to actuate the mechanical guard when an earthed body is withdrawn from the guarded region.

3. A capacitance type object detection system as claimed in claim 1 and arranged for use with a machine tool wherein means are provided responsive to said output signal operative to inhibit the operation of the machine tool when an earthed body is in the guarded region.

4. A capacitance type object detection system as claimed in claim 1 and arranged for use in a machine in which two die plates are brought together, wherein the electrode is in two sections, each section arranged around each of the die plates, the electrode around one die plate facing the electrode around the other die plate.

5. A capacitance type object detection system as claimed in claim 1 wherein the electrode is in the form of a metal strip extending along part of the periphery of the region in which the presence of an earthed body is to be detected, the screen is a metal strip of slightly greater width than the electrode and extending around the electrode on the outer side thereof with flanges extending inwardly to shield the edges of the electrode strip.

6. A capacitance type object detection system as claimed in claim 1 wherein the electrode is a metal strip with one surface facing a region to be guarded, the strip being curved so as partially to surround said region and wherein the screen is a strip of slightly greater width than the electrode and lying adjacent and parallel thereto, the screen having flanges extending adjacent the margins of the electrode strip to shield the edges thereof.

7. A capacitance type object detection system as claimed in claim 1 wherein the three-terminal impedance measuring circuit is a capacitance detection device comprising a source of alternating voltage having first and second terminals, said first terminal being earthed, an alternating current detector having two input terminals, a lead, referred to hereinafter as the neutral line connecting said second terminal of said source to one input terminal of said alternating current detector, a co-axial cable having an inner conductor and an outer conductor, the inner conductor connecting the other input terminal of said alternating current detector to said electrode, the outer conductor of said co-axial cable being connected to said screen and to said neutral line, and a balancing circuit for feeding alternating current into said detector to balance the alternating current due to the presence of an earthed body having capacitance between the body and said electrode.

8. A capacitance type object detection system as claimed in claim 7 wherein said alternating current detector comprises a high gain amplifier with a feedback circuit providing a negative feedback current to the input of the amplifier, phase sensitive detecting means, means for applying to said phase sensitive detecting means a reference signal derived from said alternating current source, and means for applying the output voltage from the amplifier to said phase sensitive detecting means to be detected thereby.

9. A capacitance type object detection system as claimed in claim 1 wherein the electrode strip comprises two metal elements facing one another, each electrode element being provided with a screen, said screens being further metal strips of slightly greater width than the associated electrode elements, the screens having flanges shielding the edges of the electrode elements.

10. A capacitance type object detection system as claimed in claim 9 and arranged for use on a machine tool having a mechanical guard comprising two gates movable towards one another to close an opening and wherein the two electrode elements are arranged on the two gates facing across the opening when the gates are apart, the electrode elements being connected in parallel to said three-terminal measuring circuit.

11. A capacitance type object detection sysytem as claimed in claim 10 wherein said gates are arranged to overlap when closed and wherein the electrode elements are arranged to face one another when said gates are open so as to define a plane in which any earthed body is detected.

12. A capacitance type object detection system for detecting the presence of an earthed object in a region to be guarded comprising a metal strip having two surfaces, one surface facing a region to be guarded, the strip being curved so as to extend arcuately around part of said region to be guarded, a conductive screen lying closely adjacent to said strip and on the outer side thereof with respect to the region to be guarded, said screen being wider than said strip and having flanges extending forwardly to screen the edges of the strip, a source of alternating voltage having first and second terminals, means connecting said first terminal to earth, an alternating current detector having two input terminals, a lead referred to hereinafter as the neutral line connecting said second terminal of said source to one input terminal of said alternating current detector, means connecting the other input terminal of said alternating current detector to said strip, and a balancing circuit for feeding alternating current into said detector to balance the alternating current due to the presence of an earthed body having capacitance between the body and said electrode.

References Cited

UNITED STATES PATENTS

| | | | |
|---|---|---|---|
| 2,395,780 | 2/1946 | Devol et al. | 192—130 |
| 2,646,559 | 7/1953 | Nutzler. | |
| 2,929,969 | 3/1960 | Denysiuk. | |
| 3,183,411 | 5/1965 | Palfi. | |
| 3,314,081 | 4/1967 | Atkins et al. | |
| 3,324,647 | 6/1967 | Jedynak. | |

FOREIGN PATENTS 812,466  4/1959  Great Britain.

MARTIN P. SCHWADRON, *Primary Examiner.*

C. M. LEEDOM, *Assistant Examiner.*